(Model.)
B. A. WILTON.
MOTOR FOR LIGHT MACHINERY.
No. 276,518. Patented Apr. 24, 1883.
Fig. 1. Fig. 2.
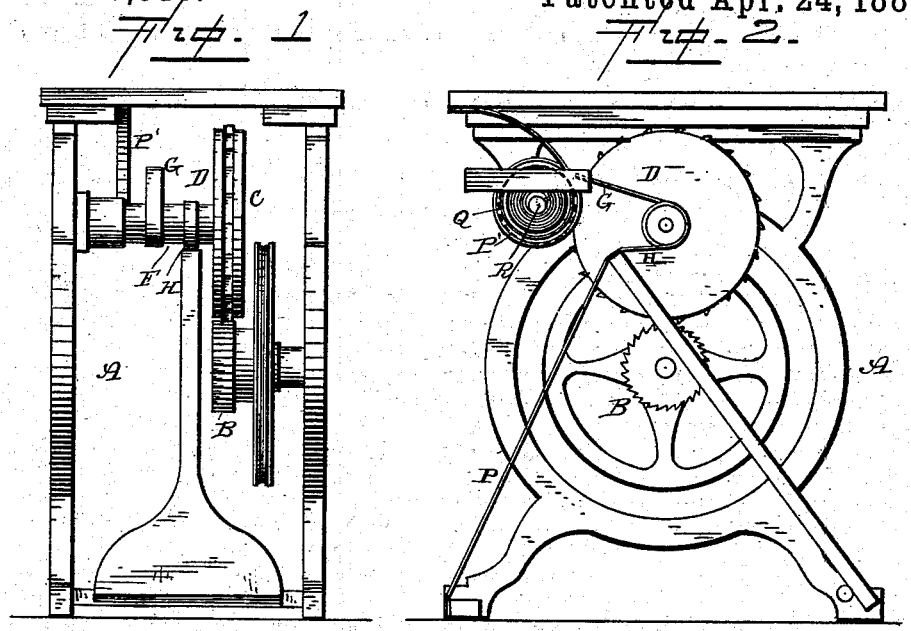
Fig. 3. Fig. 4. Fig. 5.
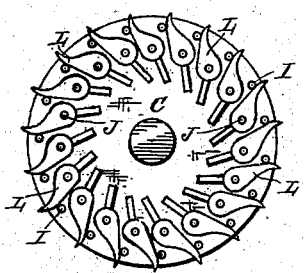 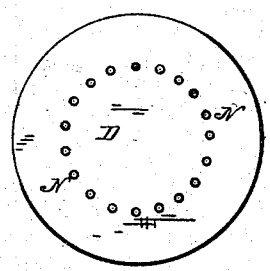 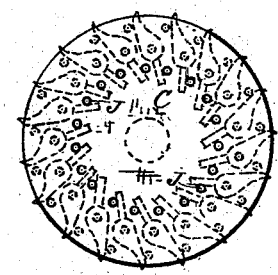
Witnesses.
Louis F. Gardner
J. W. Garner
Inventor.
B. A. Wilton
per
F. A. Lehmann, atty.

UNITED STATES PATENT OFFICE.

BENJAMIN A. WILTON, OF BERGEN POINT, NEW JERSEY.

MOTOR FOR LIGHT MACHINERY.

SPECIFICATION forming part of Letters Patent No. 276,518, dated April 24, 1883.

Application filed March 17, 1883. (Model.)

*To all whom it may concern:*

Be it known that I, BENJAMIN A. WILTON, of Bergen Point, in the county of Hudson and State of New Jersey, have invented certain new and useful Improvements in Motors for Light Machinery; and I do hereby declare the following to be a full, clear, and exact description of the invention, such as will enable others skilled in the art to which it pertains to make and use it, reference being had to the accompanying drawings, which form part of this specification.

My invention relates to an improvement in motors for light machinery; and it consists, first, in the combination of two disks, one of which is secured to the driving-sleeve, and which is provided with pins for operating the pawls, with a second disk, which is placed loosely upon a shaft or bearing, and which second disk is provided with a series of pivoted pawls, and a series of pins or projections near its outer edge for the purpose of preventing the pawls from moving too far backward; second, in the arrangement and combination of parts, which will be more fully described hereinafter, whereby the pawls placed between the two disks are made to engage with the teeth formed either upon the hub of the driving-wheel, or which are attached in any suitable manner to the wheel, and thus give it a continuous rotary motion.

The object of my invention is to provide a motor for light machinery which will cause the wheel to move by pressure upon the treadle or treadles, no matter at what point the wheel may have stopped, and thus do away with the necessity of the operator reaching under the machine and catching hold of the fly-wheel, so as to start it in the proper direction.

Figure 1 is a side elevation of my invention, taken from the side upon which the treadle is placed. Fig. 2 is an end view with the framework removed. Figs. 3 and 4 are detached views of the two driving-disks. Fig. 5 is a view of the two disks applied together, one of the disks being shown in dotted lines only.

A represents the frame of a sewing-machine, and which may be of any suitable shape, size, or construction which may be preferred. Instead of there being a shaft which extends across from one end of the frame to the other for the driving-wheel, the wheel is here placed upon a suitable short bearing, and has the teeth B either formed upon its hub or formed upon a separate piece, and then this piece secured to the hub, so as to form practically a part of the wheel. Movement is given to this wheel by means of the two disks C D, the outer one, C, being loosely journaled upon the rod or bearing which is secured to the frame, while the one D is secured to or forms part of the driving-sleeve F, around which the driving-bands G H pass. The disk C has two series of pins, I J, the ones I being placed near the edge of the disk, and the second set, J, being placed at a suitable distance inward from the edge of the disk, at about midway between those of the outer disk. Upon these pins, studs, or projections are pivoted the pawls L, which may either be of the shape here shown or any other that may be preferred, and are just long enough to project beyond the edge of the disks and engage with the teeth B on the hub of the driving-wheel. The pins or projections I, near the edge of the disk C, serve simply as stops for the pawls, so as to prevent them moving backward past a certain point. The disk D is provided with a series of pins, N, at a suitable distance from its inner edge, and these pins, when the rotary motion is imparted to the disk D, strike against the pawls, near their inner ends, and turn the pawls in position, ready to engage with the teeth B, and drive the disk C around. Each time that the treadle is depressed by the operator the disk D first moves forward, so that all of its pins will strike against the inner ends of the pawls, and thus turn them into position to engage with the teeth, and then, as a downward movement of the treadle continues, the forward movement of the disk C is imparted to the one D, so as to cause the disk D to revolve the balance-wheel, and thus operate the machine. As soon as the treadle begins to rise, the disk D being drawn back by the sleeve F and the driving-bands, its prongs or projections strike against the inner ends of the pawls, so as to draw their outer ends inward, and then the continued movement of the disk D causes the disk C to turn backward with it.

The disks may be operated either by means of the driving-bands, as here shown, or any other that may be preferred, as I do not limit my invention in this respect. As here shown, there is an elastic spring or band, P, which is secured at one end to the frame and at the other end to the inner end of the treadle, and to this inner end of the treadle is secured one of the driving-bands, H, which is made to wrap around the sleeve F. The driving-band G wraps around the sleeve F at one end, and around a small pulley, Q, which is placed upon the shaft R, to which the spring P′ is applied. This spring is coiled, and its whole tension is employed to return the sleeve F to position again after having been moved by the depression of the treadle. As the treadle is depressed the band H causes the sleeve F to revolve, and this sleeve draws the driving-band G from the pulley Q and causes the spring to be coiled tightly around the shaft. As soon as the treadle is left free to rise, this spring causes the shaft to revolve and wraps the driving-band G around its pulley, and in doing so causes the sleeve F to revolve backward, as already described, and unwind the band H.

If so desired, all of the pins which are attached to the disk C, and the pins I of the disk D, may be covered with rubber, or any suitable soft substance which will prevent the pawls from revolving and from making too much noise.

Having thus described my invention, I claim—

1. The combination of two disks provided with pins and pawls, and a suitable operating mechanism therefor, with the driving-wheel provided with teeth, and with which the pawls engage, substantially as shown.

2. The combination of the disk C, provided with the pins I J and the pawls, with the disk D, provided with pins for engaging with the inner ends of the pawls, a driving mechanism, and the balance-wheel provided with teeth or cogs for the pawls to engage with, substantially as described.

3. The combination of the treadle, the elastic bands secured to its inner end, the driving-bands G H, sleeve F, disks C D, provided with the pins and pawls, a pulley, and shaft, around which the coiled spring is wrapped, all being combined and arranged to operate substantially as set forth.

In testimony whereof I affix my signature in presence of two witnesses.

BENJAMIN A. WILTON.

Witnesses:
 JAMES BENNY,
 BLOOMFIELD GARDNER.